(12) United States Patent
Abe et al.

(10) Patent No.: US 9,637,035 B2
(45) Date of Patent: May 2, 2017

(54) VEHICLE SEAT (71) Applicant: TOYOTA BOSHOKU KABUSHIKI KAISHA, Aichi-ken (JP)

(72) Inventors: Sakino Abe, Toyota (JP); Motohiro Matsuda, Toyota (JP); Hisatomo Asano, Toyota (JP)

(73) Assignee: TOYOTA BOSHOKU KABUSHIKI KAISHA, Aichi-Ken (JP)

( * ) Notice: Subject to any disclaimer, the term of this patent is extended or adjusted under 35 U.S.C. 154(b) by 55 days.

(21) Appl. No.: 14/716,088

(22) Filed: May 19, 2015

(65) Prior Publication Data

US 2015/0336491 A1 Nov. 26, 2015

(30) Foreign Application Priority Data

May 20, 2014 (JP) ................. 2014-104121

(51) Int. Cl.
*A47C 7/02* (2006.01)
*B60N 2/64* (2006.01)
*B60N 2/68* (2006.01)
*A47C 7/24* (2006.01)
*A47C 7/18* (2006.01)
(Continued)

(52) U.S. Cl.
CPC .............. *B60N 2/646* (2013.01); *B60N 2/58* (2013.01); *B60N 2/643* (2013.01); *B60N 2/68* (2013.01); *A47C 7/18* (2013.01); *A47C 7/24* (2013.01); *B60N 2/5891* (2013.01); *B60N 2/70* (2013.01); *B61D 33/0035* (2013.01); *B64D 11/0647* (2014.12)

(58) Field of Classification Search
CPC .......... B60N 2/58; B60N 2/5891; B60N 2/70; A47C 7/24; A47C 7/18; B61D 33/0035; B64D 11/0647

USPC .............. 297/452.48, 452.58, 228.1, 452.57, 297/452.56, 452.62, 452.27, 452.33, 297/452.26, 452.32, 452.29, 452.23, 297/452.24, 452.25, 218.1, 218.2, 218.3, 297/218.4, 218.5

See application file for complete search history.

(56) References Cited

U.S. PATENT DOCUMENTS 5,607,201 A * 3/1997 Irie ........................... A47C 7/24
297/452.62
5,630,240 A * 5/1997 Matsuoka ................ A47C 7/18
297/452.25

(Continued)

FOREIGN PATENT DOCUMENTS

CN 2461409 11/2001
CN 101128140 2/2008

(Continued)

OTHER PUBLICATIONS

Chinese Office Action for CN App. No. 201510259772.1 dated Feb. 20, 2017, along with English-language translation thereof.

*Primary Examiner* — Chi Q Nguyen
(74) *Attorney, Agent, or Firm* — Greenblum & Bernstein, P.L.C.

(57) ABSTRACT

A vehicle seat includes: a seat pad that forms a supporting surface that supports a seated occupant; and a skin that is made of a knitted fabric or a woven fabric and covers the seat pad. The skin has a first region and a second region arranged adjacent to each other on the supporting surface, and the first region is lower in density and thinner than the second region.

7 Claims, 8 Drawing Sheets

(51) Int. Cl.
  *B60N 2/58* (2006.01)
  *B60N 2/70* (2006.01)
  *B61D 33/00* (2006.01)
  *B64D 11/06* (2006.01)

(56) References Cited

U.S. PATENT DOCUMENTS

| | | | | |
|---|---|---|---|---|
| 5,654,069 A * | 8/1997 | Matsuoka | ................ | A47C 7/18 297/228.13 |
| 5,702,159 A * | 12/1997 | Matsuoka | ................ | A47C 7/18 297/218.2 |
| 6,302,487 B1 * | 10/2001 | Fujita | ................... | B60N 2/5825 297/452.56 |
| 6,435,618 B1 * | 8/2002 | Kawasaki | ................ | A47C 7/28 297/452.56 |
| 6,672,671 B1 * | 1/2004 | Stoschek | ............ | B29C 44/1276 297/452.48 |
| 8,944,515 B2 * | 2/2015 | Kono | ...................... | B60N 2/64 297/218.3 |
| 2002/0176981 A1 | 11/2002 | Ali et al. | | |
| 2004/0160111 A1 * | 8/2004 | Koffler | ................... | A47C 7/022 297/452.25 |
| 2009/0302652 A1 * | 12/2009 | Yamada | ................... | B60N 2/20 297/284.11 |
| 2010/0258334 A1 * | 10/2010 | Akaike | ................ | B60N 2/5685 174/126.1 |
| 2011/0187176 A1 * | 8/2011 | Besnard | ................... | B29C 44/04 297/452.48 |
| 2012/0274104 A1 * | 11/2012 | Nishikawa | ........... | B60N 2/5685 297/180.1 |
| 2012/0306256 A1 * | 12/2012 | Okuyama | ............ | B60N 2/5825 297/452.6 |
| 2013/0270887 A1 * | 10/2013 | Matsumoto | .......... | B60N 2/4228 297/452.34 |
| 2015/0274048 A1 * | 10/2015 | Mogi | ................... | B60N 2/5642 297/452.48 |
| 2016/0052435 A1 * | 2/2016 | Nakada | .................. | B60N 2/646 297/452.48 |
| 2016/0114751 A1 * | 4/2016 | Saito | ................... | B60R 21/2176 297/216.13 |

FOREIGN PATENT DOCUMENTS

| | | |
|---|---|---|
| JP | 62-240092 | 10/1987 |
| JP | 2000-189289 | 7/2000 |
| JP | 2003-079473 | 3/2003 |
| JP | 2009-066208 | 4/2009 |
| JP | 2011-15789 | 1/2011 |

* cited by examiner

VEHICLE SEAT

INCORPORATION BY REFERENCE

The disclosure of Japanese Patent Application No. 2014-104121 filed on May 20, 2014 including the specification, drawings and abstract is incorporated herein by reference in its entirety.

BACKGROUND OF THE INVENTION

1. Field of the Invention

The invention relates to a vehicle seat.

2. Description of Related Art

Up until now, vehicle seats in which the hardness of a seat pad is partially changed to improve the seating comfort have been available. Japanese Patent Application Publication No. 2000-189289 (JP 2000-189289 A) describes technology for partially changing not only the hardness but also the modulus of repulsion elasticity of a seat pad in a seat cushion to improve the seating comfort. Specifically, in the seat cushion described in JP 2000-189289 A, both side portions in its width direction are set to be higher in hardness and lower in the modulus of repulsion elasticity than the intermediate portion. According to thus configured seat pad, the holding performance can be secured by the increased hardness of the both side portions in the width direction of a seating surface, and at the same time, an uncomfortable feeling due to a difference in the hardness can be reduced by the lower modulus of repulsion elasticity. In this way, it is expected that the seating comfort is improved.

However, there is a limitation on adjusting the seating comfort only by changing the properties of the seat pad. Particularly, when the entire seat pad is made thinner for the purpose of, for example, reduction in the weight of the seat, it is difficult to improve the seating comfort only by changing the properties of the seat pad.

SUMMARY OF THE INVENTION

The invention provides a vehicle seat for which the seating comfort can be adjusted in a mode other than changing the properties of a seat pad.

An aspect of the invention relates to a vehicle seat including: a seat pad that forms a supporting surface that supports a seated occupant; and a skin that is made of a knitted fabric or a woven fabric and covers the seat pad. The skin has a first region and a second region arranged adjacent to each other on the supporting surface, and the first region is lower in density and thinner than the second region.

According to the above aspect, the density and the thickness of the skin are partially changed to make the bending easiness of the skin partially different. Thus, the seating comfort may be adjusted with the control of deformation of the supporting surface.

The supporting surface may have a main portion that receives a load from the seated occupant in a normal seating position when a vehicle is in a stopped state and is provided at an intermediate portion in a width direction of the vehicle seat, and side support portions that protrude from both sides of the main portion in the width direction. In this case, two first regions may be provided in the skin between the main portion and the side support portions in the skin. Here, a state in which the main portion receives the load from the seated occupant in the normal seating position when the vehicle is in the stopped state indicates that the main portion mainly receives the load from the seated occupant when the seated occupant does not receive acceleration accompanied by the movement of the vehicle.

In a part of the supporting surface constituted by the second region of the skin that more hardly bends due to its higher density and greater thickness, the load from the seated occupant is dispersedly applied to the seat pad. Therefore, the surface shape of the supporting surface hardly changes. However, the first regions of the skin that easily bend due to their lower density and smaller thickness are arranged between the main portion and the side support portions. As a result, the supporting surface easily locally bends in the portions. Therefore, the region in which the surface shape hardly changes is divided in the width direction, and the main portion is greatly displaceable in a direction in which it receives the load while maintaining the surface shape. Accordingly, the seated occupant easily sinks into the supporting surface.

The supporting surface may be a backrest surface of a seat back, and the first regions may be arranged at positions at which blade bones of the seated occupant are supported. In this case, the seated occupant easily sinks into the backrest surface at the height of the blade bones around which the seated occupant is likely to swing when the vehicle turns. Therefore, the vehicle seat can improve its holding performance.

The first regions may extend from a height at which the blade bones of the seated occupant are supported to a height at which a lumbar of the seated occupant is supported so as to become gradually narrower toward a lower side of the vehicle seat. In this case, the lumbar is most unlikely to sink into the backrest surface, and the sinking degree of the main portion becomes greater toward the height of the blade bones. Therefore, the supporting surface wraps around the blade bones and the surrounding areas (around the shoulders) while firmly holding the lumbar of the seated occupant. As a result, the seating comfort can be improved.

The supporting surface may be a seating surface of a seat cushion, the first region may be arranged at a position at which a pelvis of the seated occupant is supported, and the second region may be arranged ahead of the first region. In this case, the seating surface easily deforms at its part beneath the pelvis of the seated occupant at which the first region of the skin is arranged, and thus the seated occupant easily sinks into the seating surface. While, since the load is dispersedly applied to the seat cushion in the second region ahead of the first region, the seated occupant more hardly sinks into the seating surface in the second region. Therefore, the seating surface receives the pelvis of the seated occupant in the second region that more hardly sinks when the seated occupant receives forward acceleration, whereby the seated occupant can be prevented from relatively moving to the front side.

The skin may have a third region that is arranged adjacent to and ahead of the second region and extends to a front end of the seating surface, and the third region may be lower in density and thinner than the second region. In this case, the seating surface easily deforms at the front end portion at which the third region of the skin is arranged, and thus occupant's feet motions are not easily hindered. Therefore, the seated occupant easily performs a pedaling operation in, for example, the driver's seat or the like of the vehicle while being prevented from relatively moving to the front side.

The skin may be made of a piece of seamless knitted fabric or woven fabric, and the skin may be integrated with a front surface of the seat pad when molding the seat pad. When the skin is integrally molded with the front surface of the seat pad, the seating comfort can be adjusted by the skin although it is difficult to partially change the hardness or the like of the seat pad.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Figure 1:
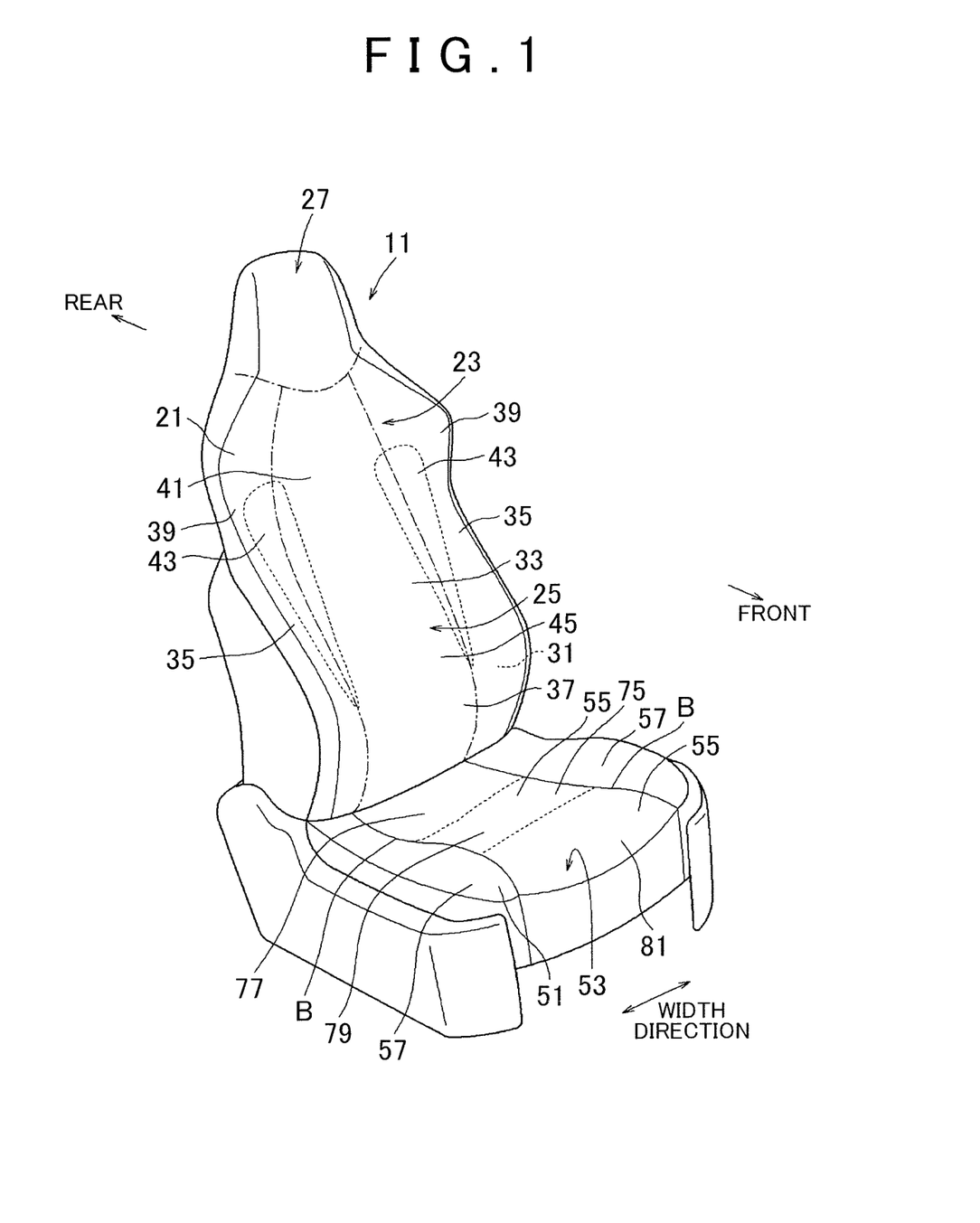
FIG. 1 is a perspective view of a vehicle seat according to the embodiments of the invention.
Figure 2:
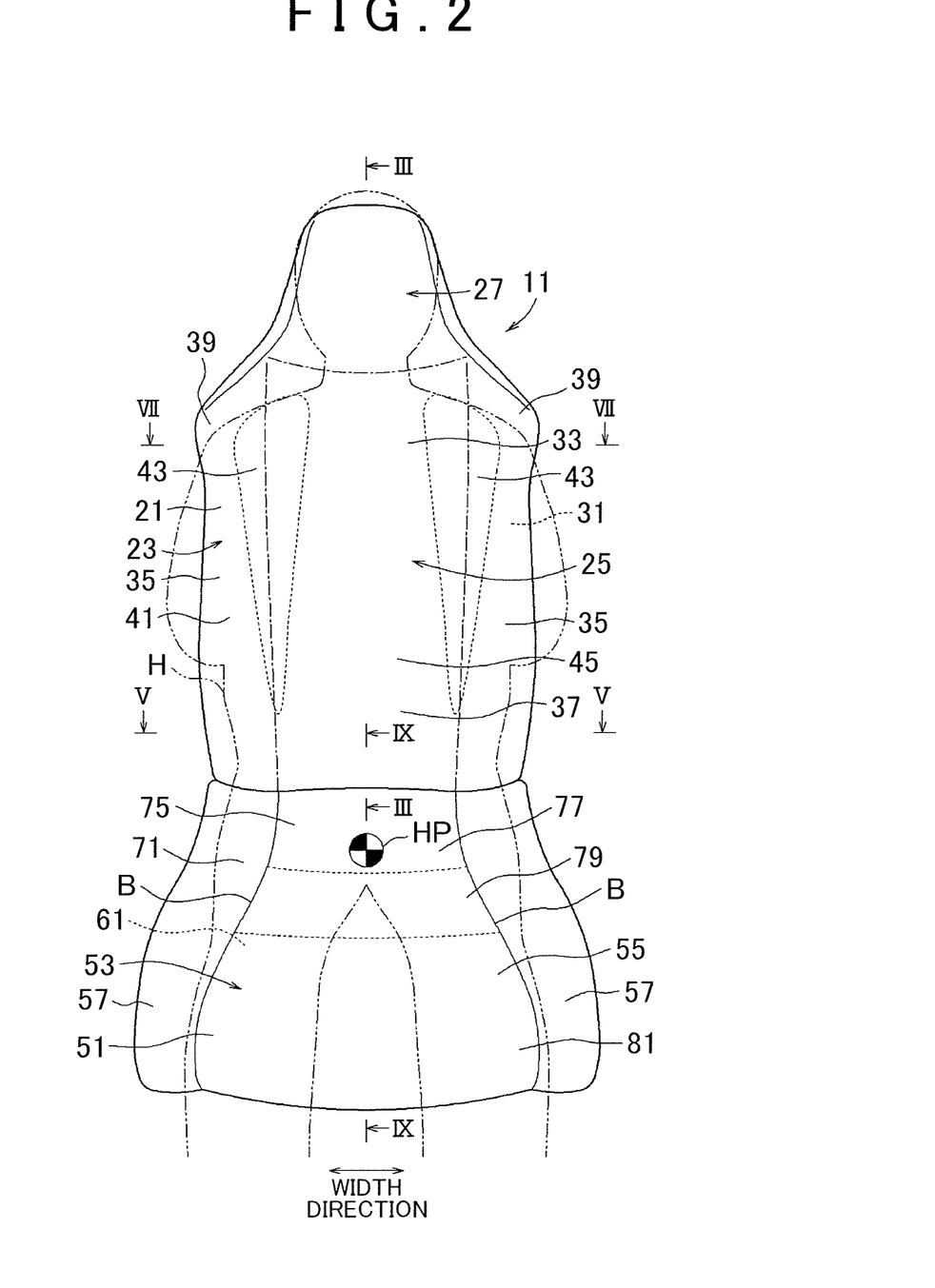
FIG. 2 is a front view of the vehicle seat shown in FIG. 1.

A description will be given of the embodiments of the invention with reference to the drawings. FIGS. 1 and 2 show a vehicle seat 11 that has a seat back 21 (first embodiment) to which an aspect of the invention is applied and a seat cushion 51 (second embodiment) to which another aspect of the invention is applied. Note that in each of FIGS. 3 to 10 that show the section of the vehicle seat 11, the thickness of a skin is made extremely greater than that according to the actual proportion of the thickness of the skin to the thickness of a member other than the skin in order to more distinctly indicate the characteristics of the vehicle seat 11. Accordingly, there are some portions different in the proportions of the sizes between other members and the proportions of the sizes between the drawings.

Figure 3:
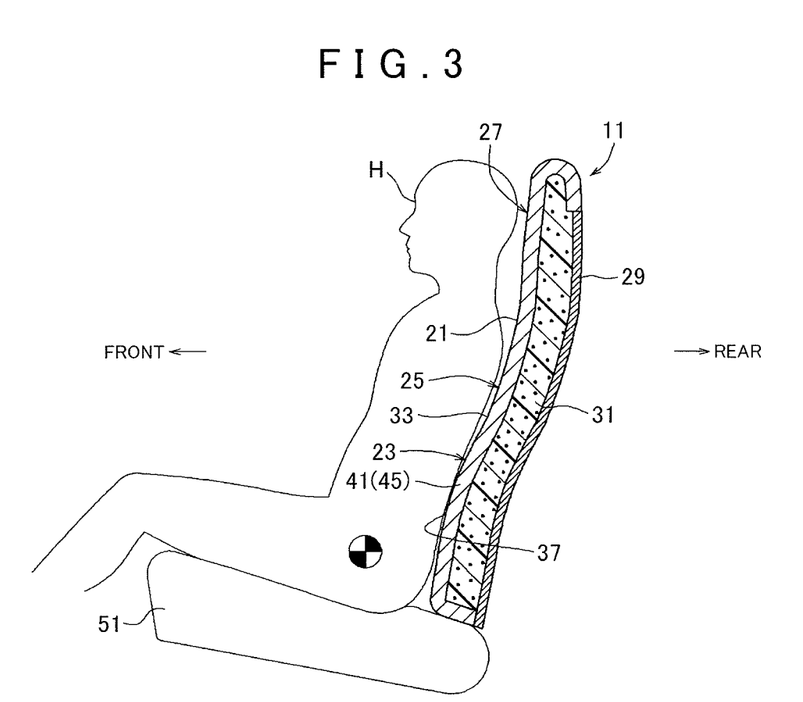
FIG. 3 is a sectional view taken along the line of the seat back of the vehicle seat shown in FIG. 2.

First, the configuration of the seat back 21 according to a first embodiment will be described. The seat back 21 has, as a supporting surface 23 that supports a seated occupant H, a backrest surface 25 that supports the back, and has a headrest portion 27 integrally formed on its upper side. Note that in FIGS. 1 and 2, the distinction between the backrest surface 25 and the headrest portion 27 of the supporting surface 23 is shown by a dashed line for convenience. As shown in FIG. 3, the supporting surface 23 is formed by a seat pad 31. The seat pad 31 is covered with a shell 29, which is a rigid body, at its rear surface and held by the shell 29. The seat pad 31 is made of urethane foam and has uniform hardness. The front surface of the seat pad 31 that forms the supporting surface 23 is covered with a skin 41 along its surface shape.

As shown in FIGS. 1 and 2, the backrest surface 25 of the seat back 21 has a main portion 33 that supports the back of the seated occupant H at the intermediate portion in a width direction of the vehicle seat 11 and side support portions 35 that protrude from the main portion 33 on both sides in the width direction. Note that in FIGS. 1 and 2, the distinction between the main portion 33 and the side support portions 35 of the backrest surface 25 is shown by dashed lines for convenience. As shown in FIG. 3, the main portion 33 has a shape along gently curved along an up-down direction of the vehicle seat 11. The main portion 33 has a gently-expanding lumbar support part 37 at a height position at which the lumbar of the seated occupant H is supported, and the lumbar of the seated occupant H is continuously supported by the lumbar support part 37 when the seated occupant H is in a normal seating position. As shown in FIGS. 1 and 2, the side support portions 35 have respective shoulder support parts 39 at height positions at which the shoulders and the surrounding areas of the seated occupant H are supported. The shoulder support part 39 has a degree of protrusion from the main portion 33 greater than those at other parts.

The skin 41 that constitutes the supporting surface 23 is formed by a piece of seamless knitted fabric. The skin 41 is integrated with the front surface of the seat pad 31 when molding the seat pad 31. That is, urethane is foamed with the skin 41 arranged in a mold in order to integrate the skin 41 with the front surface of the seat pad 31 simultaneously when the seat pad 31 made of urethane foam is molded. The skin 41 is partially different in thickness and density and thus is partially different in rigidity. The skin 41 has first regions 43, and a second region 45 with rigidity different from that of the first regions 43. In FIGS. 1 and 2, the boundaries between the regions of the skin 41 different in thickness and density are shown by broken lines for convenience.

The first regions 43 are regions lower in density and thinner than the second region 45 and thus more easily bend. The first regions 43 are formed by plain knitting in the first embodiment. The second region 45 is a region higher in density and thicker than the first regions 43 and thus more hardly bends. The second region 45 is formed by rib knitting in the first embodiment. Since the density and the thickness of the skin 41 are partially different as described above, the deformation easiness of the backrest surface 25 is partially different. That is, the second region 45 of the skin 41 is higher in rigidity and hardly bends. Therefore, the second region 45 disperses a load applied from the seated occupant H to the seat pad 31 in a greater amount. As a result, the backrest surface 25 receives the load in a wider range and gently sinks in the second region 45. On the other hand, the first regions 43 of the skin 41 more easily bend and thus relatively easily expand. Therefore, the first regions 43 more easily deform their surface shape.

Of the backrest surface 25, the first regions 43 are arranged between the main portion 33 and the side support portions 35 at both side portions of the main portion 33 of the backrest surface 25. The first regions 43 become the widest at a position at which the blade bones of the seated occupant H are supported and become gradually narrower toward their lower side. The lower ends of the first regions 43 extend to the lumbar support part 37 that supports the lumbar of the seated occupant H. A region other than the first regions 43 is provided as the second region 45.

Figure 5:
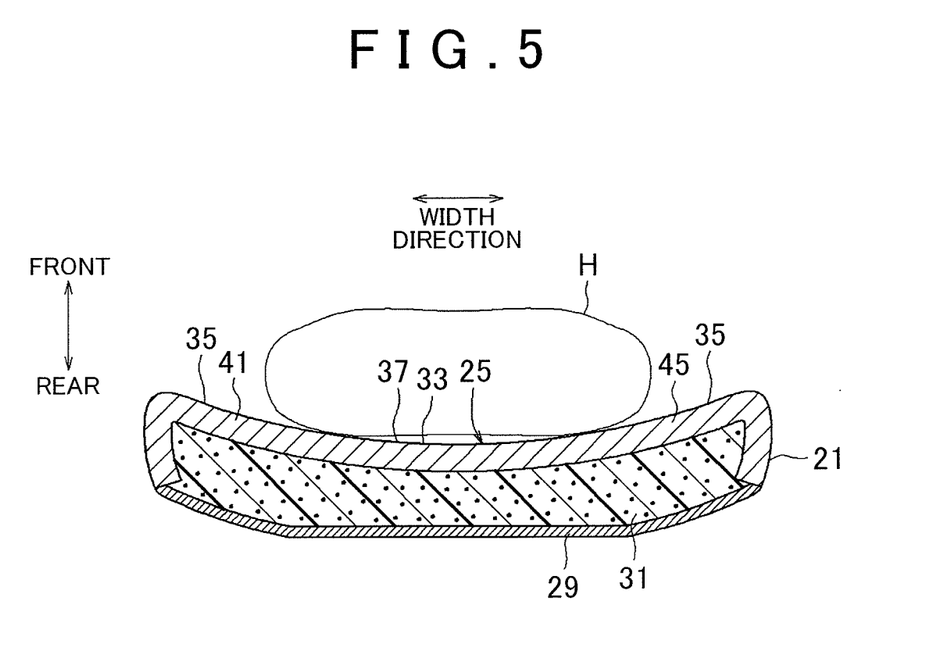
FIG. 5 is a sectional view taken along the line V-V of the seat back of the vehicle seat shown in FIG. 2.
Figure 6:
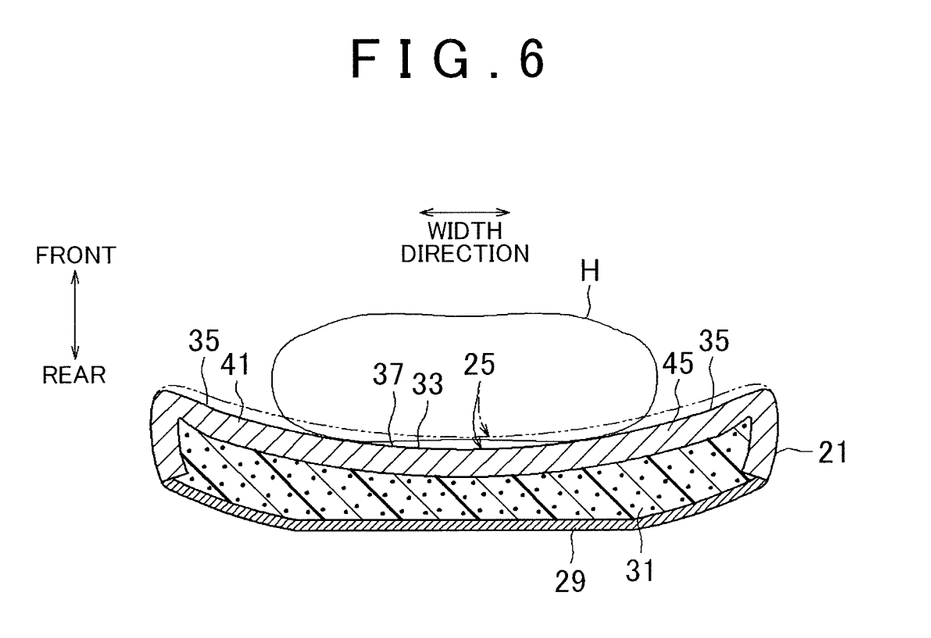
FIG. 6 is a view showing deformation of the backrest surface when the seated occupant receives the backward acceleration in the seat back shown in FIG. 5.

Next, deformation of the backrest surface 25 of the seat back 21 will be described as well as its function and effect. FIGS. 5 and 6 show deformation of the backrest surface 25 at the height at which the lumbar of the seated occupant H is supported, i.e., at the height at which the first regions 43 are not provided. FIG. 6 shows deformation of the backrest surface 25 when the back of the seated occupant H is pushed against the backrest surface 25 after the seated occupant H receives backward acceleration. At this height, the entire backrest surface 25 is constituted by the second region 45 that has higher rigidity. Therefore, the load applied to the main portion 33 at the intermediate portion is dispersed into the main portion 33 over the entire width of the backrest surface 25. After receiving the load from the seated occupant H, the backrest surface 25 that includes the main portion 33 and both the side support portions 35 gently sinks over the entire width. Accordingly, the backrest surface 25 is displaced in a small amount in the (backward) direction in which the load is applied, and thus the lumbar of the seated occupant H hardly sinks into the backrest surface 25.

Figure 4:
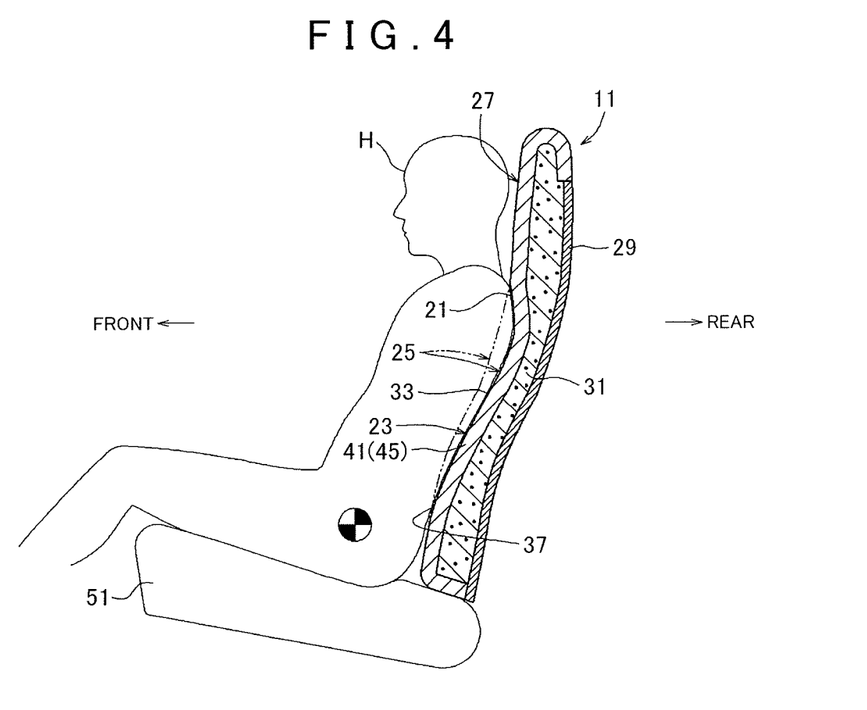
FIG. 4 is a view showing deformation of a backrest surface when a seated occupant receives backward acceleration in the seat back shown in FIG. 3.
Figure 7:
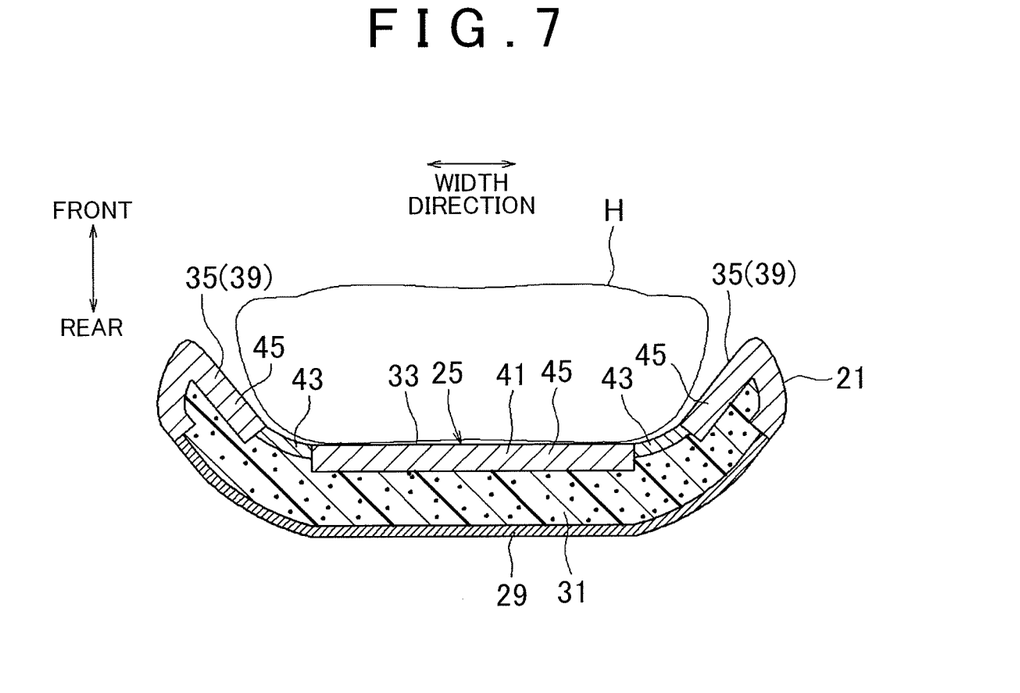
FIG. 7 is a sectional view taken along the line VII-VII of the seat back of the vehicle seat shown in FIG. 2.
Figure 8:
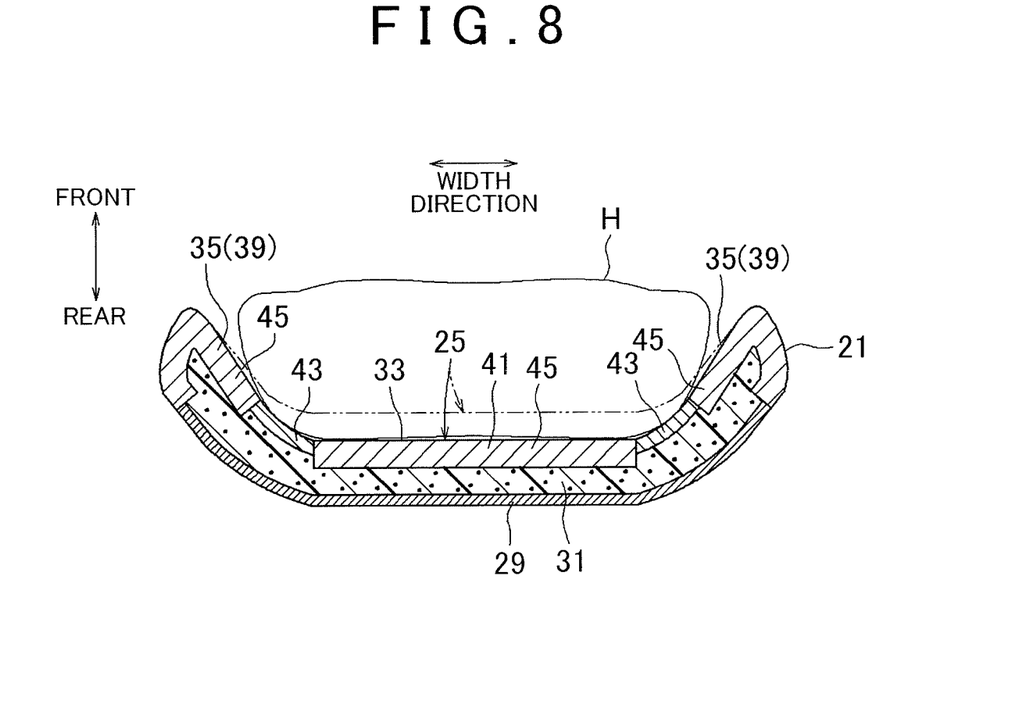
FIG. 8 is a view showing deformation of the backrest surface when the seated occupant receives the backward acceleration in the seat back shown in FIG. 7.

FIGS. 7 and 8 show deformation of the backrest surface 25 at the height at which the blade bones of the seated occupant H are supported. FIG. 8 shows deformation of the backrest surface 25 when the back of the seated occupant H is pushed against the backrest surface 25 after the seated occupant H receives backward acceleration. At this height, the first regions 43 that have lower rigidity are provided between the main portion 33 and the side support portions 35 on both sides of the main portion 33 in the width direction. Accordingly, the second regions 45 provided at the main portion 33 and both the side support portions 35 are divided by the first regions 43 in the width direction. Therefore, when the back of the seated occupant H is pressed against the main portion 33, the load is dispersedly applied to the main portion 33. However, the first regions 43 that more easily bend are provided on both sides of the main portion 33 in the width direction. Therefore, the side support portions 35 are almost free from the dispersion of the load applied to the main portion 33, and the first regions 43 relatively greatly bend. As a result, compared with the displacement of the main portion 33 at heights at which the first regions 43 are not provided, the main portion 33 is allowed to be displaced in a greater amount in the first regions 43 in the (backward) direction in which the load is applied. Accordingly, the seated occupant H easily sinks into the backrest surface 25. Here, as shown in FIG. 2 for example, the first regions 43 of the supporting surface 23 that have lower rigidity become gradually narrower from the upper side on which the blade bones of the seated occupant H are supported to the lower side. While, the second regions 45 of the main portion 33 that have higher rigidity become gradually wider toward the lower side. Therefore, as shown in FIG. 4, the main portion 33 is displaceable in the greatest amount in the (backward) direction in which the load is applied at the blade bones (shoulders) and the surrounding areas, and its displacement degree becomes gradually smaller toward the lower side. That is, the backrest surface 25 of the seat back 21 easily sinks at the shoulders and the surrounding areas of the seated occupant H, and gradually becomes hard to sink toward the lumbar. Accordingly, the seat back 21 may hold the shoulders and the surrounding parts, which are easily deviated with the movement of the vehicle, so as to be wrapped and reliably support the lumbar and the surrounding parts.

In addition, the backrest surface 25 of the seat back 21 is constituted by the first regions 43 that have lower rigidity at the positions at which the blade bones as the movable parts of the back of the seated occupant H are supported. Thus, the backrest surface 25 is easily locally sunk by pressing. Therefore, the movement of the blade bones is hardly hindered in a state in which the back of the seated occupant H is reliably supported mainly by the second region 45 that has higher rigidity at the intermediate portion.

The first embodiment may be modified without departing from the scope of the invention. For example, although the two types of regions (the first regions 43 and the second regions 45) different in thickness and density and different in bending easiness are provided in the skin 41 that constitutes the backrest surface 25 in the first embodiment, three or more types of regions different in bending easiness may be provided in the same skin. For example, fourth regions that more easily bend than the first regions 43 may be provided in the first regions 43 that more easily bend than the second region 45.

In addition, although the seat pad and the skin are integrated with each other in the first embodiment, the skin may be bonded to the front surface of the seat pad. Moreover, the seat pad is not limited to one that has uniform hardness but may include one whose hardness is partially different.

Figure 9:
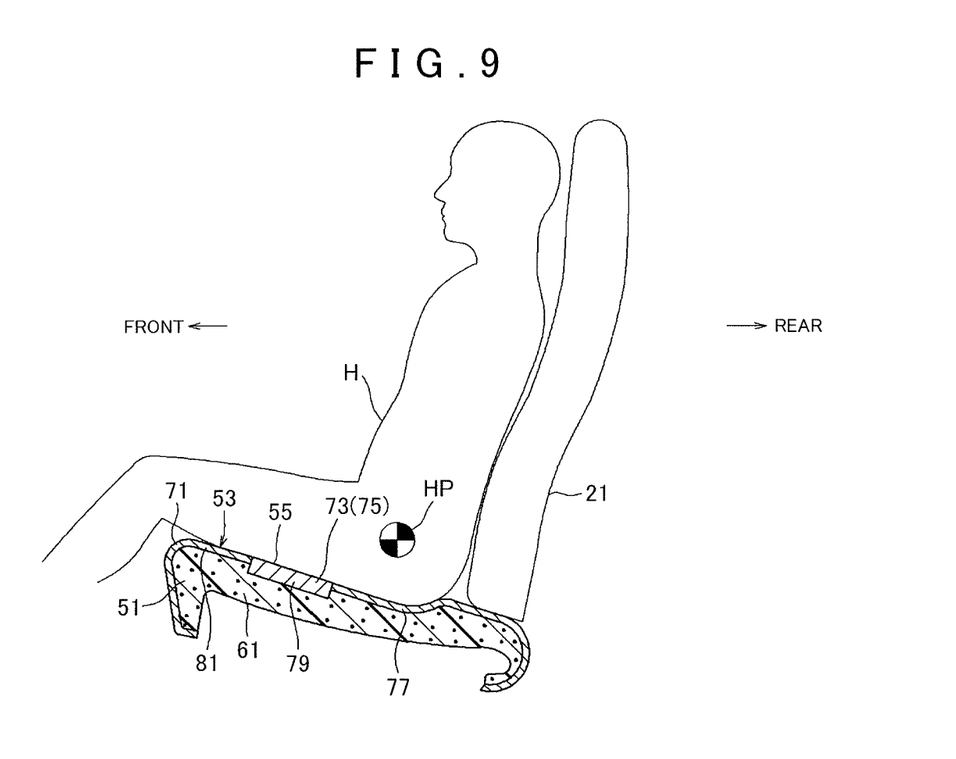
FIG. 9 is a sectional view taken along the line IX-IX of the seat cushion of the vehicle seat shown in FIG. 2.

First, the configuration of the seat cushion 51 according to a second embodiment will be described. As shown in FIGS. 1 and 2, the seat cushion 51 has, as the supporting surface 23 that supports the seated occupant H, a seating surface 53 on which the seated occupant H sits down. The seating surface 53 is formed by a cushion pad 61. The cushion pad 61 functions as a seat pad. As shown in FIG. 9, the cushion pad 61 is put on a frame-shaped cushion frame (not shown). The upper surface of the cushion pad 61 forms the seating surface 53, and the lower surface thereof is elastically supported by S-shaped springs (not shown) laid over the cushion frame. The cushion pad 61 is made of urethane foam. The cushion pad 61 is covered with a cushion cover 71 arranged along the front surface of the seat cushion 51. The shape of the upper surface of the cushion pad 61, i.e., the shape of the seating surface 53 is substantially flat at the intermediate portion in the width direction of the cushion pad 61. The upper surface of the cushion pad 61 protrudes from its both sides in the width direction and gently upwardly slants toward the front side in its entirety. A substantially flat portion at the intermediate portion in the width direction is called a main portion 55, and protruding portions on both sides are called side support portions 57 (see FIG. 1 for example).

As shown in FIG. 9, the bag-shaped cushion cover 71 covers the upper surface and the side surfaces of the cushion pad 61, and its opening edge is accommodated into the lower side of the cushion pad 61. The cushion cover 71 has a skin 73 that constitutes its outer surface. Although not shown in the figures, the skin 73 has an inner surface in which a thin sponge pad and a back foundation fabric made of a thin woven material are appropriately laminated to each other. The cushion cover 71 is formed into a bag that has a shape corresponding to the three-dimensional shape of the cushion pad 61 in such a way as to stitch the constituent pieces (skin pieces) of the cut-out skin 73 together. As shown in FIG. 1 for example, the cushion cover 71 is tucked in grooves formed in the cushion pad 61 along boundary lines B between the main portion 55 and the side support portions 57 to be fixed. Thus, the cushion cover 71 is provided along the concavo-convex shape of the upper surface of the cushion pad 61.

The main portion 55 is provided with a skin piece 75 formed by a piece of seamless knitted fabric. The skin piece 75 is partially different in thickness and density and thus partially different in rigidity. The skin piece 75 has a first region 77, a second region 79, and a third region 81 that are different in rigidity. The first region 77, the second region 79, and the third region 81 are arranged so as to divide the main portion 55 in a front-back direction of the vehicle seat 11. In FIGS. 1 and 2, the boundaries between the regions of the skin piece 75 different in thickness and density are shown by broken lines for convenience.

As shown in FIG. 9, the first region 77 is a region lower in density and thinner than the second region 79 and thus more easily bends. The first region 77 is formed by plain knitting in the second embodiment. The first region 77 is arranged beneath the hip point HP (pelvic position) of the seated occupant H. The second region 79 is a region higher in density and thicker than the first region 77 and more hardly bends. The second region 79 is formed by rib knitting in the second embodiment. The second region 79 has a strip shape that extends in the width direction of the main portion 55, is arranged in succession ahead of the first region 77, and is positioned on the front side of the pelvis of the seated occupant H. The third region 81 is a region lower in density and thinner than the second region 79 and thus more easily bends. In the second embodiment, the third region 81 is formed by plain knitting like the first region 77 and has bending easiness equivalent to the bending easiness of the first region 77.

Figure 10:
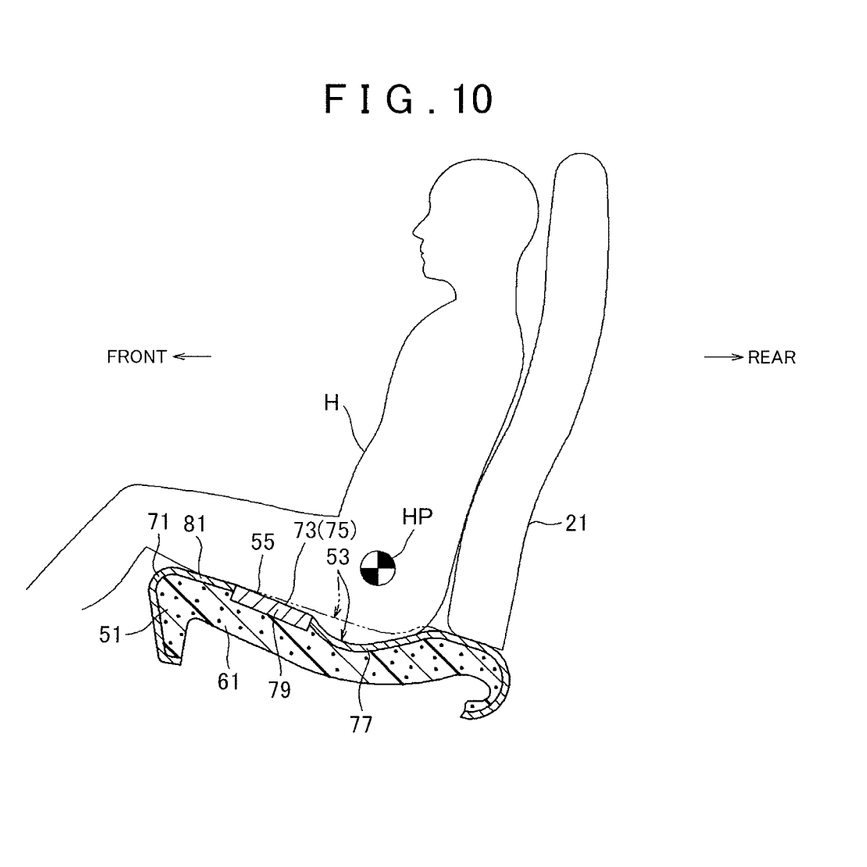
FIG. 10 is a view showing deformation of a seating surface when the seated occupant receives forward acceleration in the seat cushion shown in FIG. 9.

Next, deformation of the seating surface 53 of the seat cushion 51 will be described as well as its function and effect. The seat cushion 51 prevents the seated occupant H from being deviated to the front side when the seated occupant H receives forward acceleration. In the first region 77 right beneath the hip point HP of the seated occupant H, the skin piece 75 more easily bends and thus the dispersion of the load becomes smaller. Therefore, the first region 77 easily sinks in a relatively greater amount in a state in which the seated occupant H fits the seating surface 53 well. While, the second region 79 ahead of the first region 77 has higher rigidity, and thus the dispersion of the load from the seated occupant H becomes greater. Therefore, the second region 79 more gently sinks. Accordingly, as shown in FIG. 10, when the weight of the seated occupant H is shifted to the front side after the seated occupant H receives forward acceleration, the load from the seated occupant H is received by the second region 79, whereby the seated occupant H hardly slips to the front side. Here, in the third region 81 positioned ahead of the second region 79 and extends to the front end of the seating surface 53, the skin piece 75 more easily bends and thus its surface shape may relatively easily deform. Accordingly, even when the seat cushion 51 is applied to a driver's seat, it hardly hinders the pedaling operation of the seated occupant H.

The second embodiment may be modified without departing from the scope of the invention. For example, although the three types of regions (the first region 77, the second region 79, and the third region 81) different in thickness and density and different in bending easiness are provided in the skin 73 that constitutes the seating surface 53 in the second embodiment, four or more types of regions different in bending easiness may be provided in the same skin. For example, a fourth region that more easily bends than the first region 77 may be provided in the first region 77 that most easily bends.

In addition, although the skin is attached to the cushion pad as the cushion cover to constitute the seating surface in the second embodiment, the skin may be integrated with the cushion pad when molding the cushion pad or the skin may be bonded to the cushion pad to be integrated. Moreover, the cushion pad is not limited to one that has uniform hardness but may include one whose hardness is partially different.

The invention is not limited to each of the above embodiments and the specific modified aspects. For example, it is possible to make the thicknesses and the densities of the skins partially different in such a way as to partially change the knitting textures, but the specific combinations of the knitting textures are not limited to the examples in the above embodiments. In addition, the invention may use a skin made of a woven fabric (three-dimensional woven fabric).

The term vehicle may refer to any machine or conveyance that carries people or things from one place to another such as an automobile, a truck, a bus, a train, an aircraft, a boat, a vessel, and a submarine. However, it is noted that these examples are merely provided for purposes of enhancing understanding the present disclosure, and thus should not be construed as limiting.

What is claimed is:

1. A vehicle seat comprising:
   a seat pad that forms a supporting surface that supports a seated occupant; and
   a skin that is made of a knitted fabric or a woven fabric and covers the seat pad, wherein
   the skin has a first region and a second region arranged adjacent to each other on the supporting surface, and
   the first region is lower in density and thinner than the second region.

2. The vehicle seat according to claim 1, wherein
   the supporting surface includes:
      a main portion that receives a load from the seated occupant in a normal seating position when a vehicle is in a stopped state, the main portion being provided at an intermediate portion in a width direction of the vehicle seat; and
      side support portions that protrude from both sides of the main portion in the width direction, and
   two first regions are provided in the skin between the main portion and the side support portions in the skin.

3. The vehicle seat according to claim 2, wherein
   the supporting surface is a backrest surface of a seat back, and
   the first regions are arranged at positions at which blade bones of the seated occupant are supported.

4. The vehicle seat according to claim 3, wherein
   the first regions extend from a height at which the blade bones of the seated occupant are supported to a height at which a lumbar of the seated occupant is supported so as to become gradually narrower toward a lower side of the vehicle seat.

5. The vehicle seat according to claim 1, wherein
   the supporting surface is a seating surface of a seat cushion,
   the first region is arranged at a position at which a pelvis of the seated occupant is supported, and
   the second region is arranged ahead of the first region in a front direction of the vehicle seat.

6. The vehicle seat according to claim 5, wherein
   the skin has a third region that is arranged adjacent to and ahead of the second region in the front direction of the vehicle seat and extends to a front end of the seating surface, and
   the third region is lower in density and thinner than the second region.

7. The vehicle seat according to claim 1, wherein
the skin is one of a seamless knitted fabric or a woven fabric, and
the skin is integrated with a front surface of the seat pad when molding the seat pad.

* * * * *